US012607808B2

(12) United States Patent (10) Patent No.: US 12,607,808 B2

Genau et al. (45) Date of Patent: Apr. 21, 2026

(54) PUSH-PULL PLUG WITH LOCK

(71) Applicant: HARTING ELECTRONICS GMBH, Espelkamp (DE)

(72) Inventors: Marc Genau, Lübbecke (DE); Alexander Ellermann, Hunteburg (DE)

(73) Assignee: HARTING ELECTRONICS GMBH, Espelkamp (DE)

( * ) Notice: Subject to any disclaimer, the term of this patent is extended or adjusted under 35 U.S.C. 154(b) by 310 days.

(21) Appl. No.: 18/547,493

(22) PCT Filed: Feb. 11, 2022

(86) PCT No.: PCT/DE2022/100117

§ 371 (c)(1),
(2) Date: Aug. 22, 2023

(87) PCT Pub. No.: WO2022/179661

PCT Pub. Date: Sep. 1, 2022

(65) Prior Publication Data

US 2024/0053550 A1      Feb. 15, 2024

(30) Foreign Application Priority Data

Feb. 23, 2021     (DE) ..................... 10 2021 104 251.8

(51) Int. Cl.
G02B 6/38                (2006.01)
(52) U.S. Cl.
CPC .................................. G02B 6/3893 (2013.01)
(58) Field of Classification Search
CPC ............................ G02B 6/3893; G02B 6/3894
See application file for complete search history.

(56) References Cited

U.S. PATENT DOCUMENTS 5,190,466 A        3/1993   McVey
9,182,556 B2 *  11/2015   Leidolt ................ G02B 6/3624
(Continued)

FOREIGN PATENT DOCUMENTS

CN            108352655  A       7/2018
DE      102008012125  A1       9/2009
(Continued)

OTHER PUBLICATIONS

International Preliminary Report on Patentability, issued Aug. 29, 2023, for International Application No. PCT/DE2022/100117. (6 pages).

(Continued)

*Primary Examiner* — Rhonda S Peace
(74) *Attorney, Agent, or Firm* — Seed Intellectual Property Law Group LLP

(57)                ABSTRACT

A plug is provided which has a main body and a sliding element, the sliding element encompassing the main body and being arranged thereon so as to be movable along a plugging axis of the plug, the plug having a blocking element which is arranged on the sliding element so as to be rotatable between an open position and a locked position, the axis of rotation of the blocking element being perpendicular to the plugging axis of the plug, or the plug having a blocking element which is arranged on the sliding element so as to be slidable between an open position and a locked position, the sliding axis of the blocking element being perpendicular to the plugging axis of the plug.

9 Claims, 3 Drawing Sheets

(56)        References Cited

U.S. PATENT DOCUMENTS

| 10,873,158 | B2 * | 12/2020 | Lückemeier | ....... | H01R 13/6277 |
|---|---|---|---|---|---|
| 2017/0170596 | A1 | 6/2017 | Goossens et al. | | |
| 2018/0252872 | A1 | 9/2018 | Chen | | |
| 2019/0219775 | A1 * | 7/2019 | Iizumi | .................... | G02B 6/387 |
| 2024/0053550 | A1 * | 2/2024 | Genau | .................... | G02B 6/387 |

FOREIGN PATENT DOCUMENTS

| DE | 212013000073 | U1 | 10/2014 |
|---|---|---|---|
| DE | 202015105840 | U1 | 2/2017 |
| DE | 102019112899 | B3 | 10/2020 |
| FR | 2933243 | A1 | 1/2010 |
| WO | WO 2015063048 | A1 | 5/2015 |
| WO | WO 2017084654 | A1 | 5/2017 |
| WO | 2020229392 | A1 | 11/2020 |

OTHER PUBLICATIONS

European Patent Office, International Search Report and Written Opinion for international application No. PCT/DE2022/100117, mailed May 11, 2022, 12 pages (with English translation of International Search Report).
German Patent Office, Office Action for German application No. 10 2021 104 251.8 dated Feb. 2, 2022, 6 pages.

\* cited by examiner

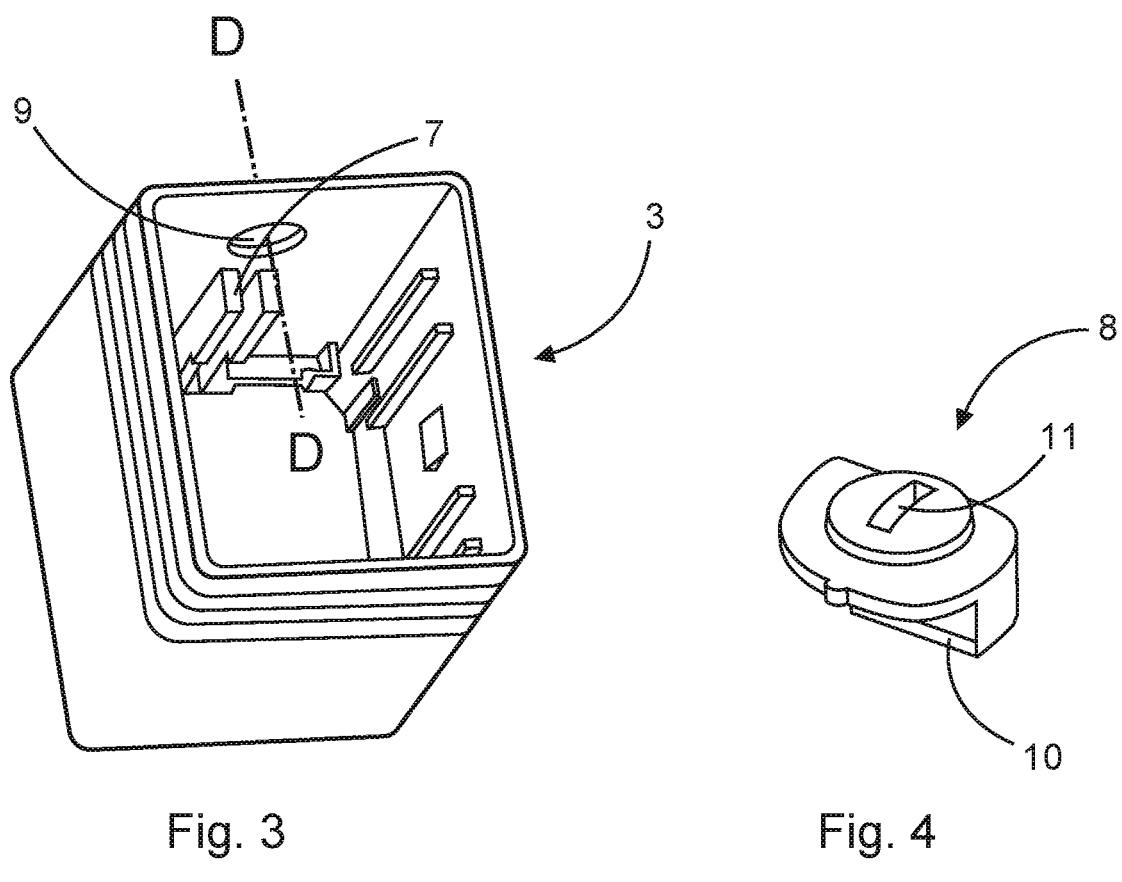
Fig. 3                    Fig. 4
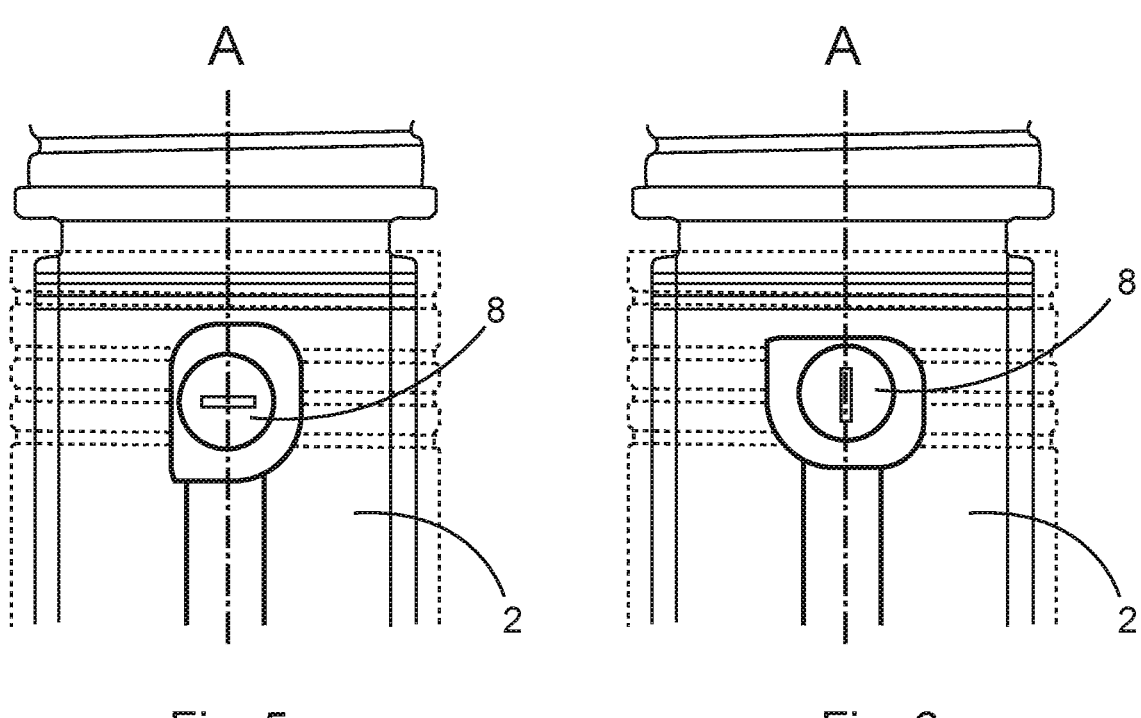
Fig. 5                    Fig. 6

PUSH-PULL PLUG WITH LOCK

BACKGROUND

Technical Field

Embodiments of the present disclosure relate to a plug having a main body and a sliding element, wherein the sliding element encompasses the main body and is arranged thereon so as to be movable along a plugging axis of the plug.

Plugs of this type enable the reversible interconnection of cables. Plugs are attached to the ends of cables and individual conductors in the cable are provided with contact elements that are accommodated in the plug. When the plug is connected to another mating plug or a socket, the contact elements make contact with corresponding contact elements in the mating plug or in the socket.

Generic plugs are also called push-pull plugs. These plugs function according to the same basic principle. To ensure a secure connection to a mating plug, these plugs usually have latching means that enable the plugs to latch together. Various mechanisms are known from the prior art to release the latching. A frequently used mechanism is the so-called push-pull lock. Here, the plug automatically latches when it is connected to the mating plug. Latching is achieved by pushing. The lock is released by pulling on a sliding element, which at least partially forms the housing of the plug. When the sliding element is moved against the plugging direction, the mechanism for latching the plug is actuated and the plug is released from the mating plug.

Description of the Related Art

Various push-pull plugs are known from the prior art, which all latch and unlatch according to a similar principle. By plugging a plug onto a mating plug, both are latched together. Pulling on a sliding element releases the latch, thus allowing the plug to be removed.

A disadvantage of the known solutions is that the simplicity of the design can also have a negative effect. By simply pulling off the plug, this can be detached from the mating plug and disconnected. Depending on the application, this can have a negative effect and may be unintentional. For example, if a large number of push-pull plugs are arranged in a very confined space, pulling off one plug may inadvertently disconnect and decouple an adjacent plug as well.

The document WO 2017/084654 A1 shows a push-pull plug with a locking mechanism that prevents the plug from being accidentally pulled off and an associated unintentional disconnection of a connection. However, such a mechanism has a complex design and therefore involves higher production costs.

The German Patent and Trade Mark Office has searched the following prior art in the priority application for the present application: US 2017/0170596 A1 and WO 2015/063048 A1.

BRIEF SUMMARY

Embodiments of the present disclosure provide a push-pull plug which can be secured against accidental unlocking and disconnection. The plug is to be designed in such a way that at least one additional handle must be used to release the plug. For ease of use, however, it should still be possible to operate the plug with one hand. Furthermore, the plug should not cause significantly higher production costs than a comparable plug without locking function.

The plug described herein fundamentally has a main body and a sliding element. The plug has a plugging side and a connection side, wherein the plug forms a plugging axis which extends through the plug from the plugging side to the connection side.

The sliding element encompasses the main body and is arranged or mounted on the main body so as to be movable along the plugging axis of the plug.

In some embodiments, the plug may have a blocking element which is arranged on the sliding element so as to be rotatable between an open position and a locked position.

Advantageously, the axis of rotation of the blocking element may be oriented perpendicular to the plugging axis of the plug. This does not increase the spatial requirement of the plug—in the direction of its plugging axis.

In some embodiments, the blocking element penetrates the sliding element. This means that the blocking element is arranged inside an opening in the sliding element and projects out of the sliding element both internally, i.e., towards the main body, and externally, i.e., away from the main body. This allows the blocking element to be integrated on the plug in a space-saving way.

Advantageously, the sliding element may have an internal guide rail running parallel to the plugging axis of the plug. Along the guide rail, the sliding element can be pushed back and forth along the plugging axis for the purpose of connection to a socket or a mating plug, as already described in detail above.

In some embodiments, the blocking element has a rib facing the main body. When the rib is perpendicular to the guide rail, the blocking element is in the locked position. When the rib is parallel to the guide rail, the blocking element is in the open position. Such a mechanism is very simple to construct. The mechanical function of the rib is explained in greater detail below.

Advantageously, two tabs arranged parallel to each other may be integrally molded on the main body. These tabs have a dual function. Firstly, they fix the sliding element captively to the main body. Furthermore, the guide rail of the sliding element runs between the tabs so that the sliding element can be moved back and forth on the main body smoothly and without jamming, but only when the blocking element is in the open position.

When the blocking element is in the locked position, the rib of the guide element abuts against the tabs of the main body. This prevents a sliding movement of the sliding element, and a connection of the plug cannot be separated.

In an advantageous embodiment, the blocking element may have, on the outside, a contour in which a tool can engage. The tool can be used to generate the rotational movement of the blocking element required for locking and unlocking. The contour can be a slot, for example, in which a slotted screwdriver can engage. However, a cross-slot, internal hexagon socket, internal rounded hexagon socket or external hexagon socket (also known as Torx) is also conceivable. A raised contour onto which, for example, a so-called nut from a so-called ratchet box can be placed is also conceivable in principle. Of course, other designs are conceivable and can be implemented.

In an alternative embodiment, the main body of the plug has a groove in which the blocking element is displaceably mounted. The direction of displacement of the blocking element is oriented here perpendicular to the plugging axis and thus also perpendicular to the direction of displacement of the sliding element.

The blocking element may have an outwardly directed blocking rib. In this case, the sliding element has a recess in which the blocking rib can be accommodated with a precise fit.

When the blocking element is in its open position, the sliding element can be pushed back and forth on the main body in the direction of the plugging axis of the plug. In the case of a sliding movement against the plugging direction, the recess engages over the blocking rib of the blocking element.

When the blocking element is in its locked position, the sliding element on the main body can no longer be pushed against the plugging direction. The sliding element is then blocked by the blocking rib of the blocking element.

In some embodiments, the blocking elements can be easily designed so that they can be operated with only one tool or completely without tools. This requires only marginal changes to the outer contour of the blocking element. Thus, plugs can be provided in both variants so that the plugs can serve different applications or requirements.

BRIEF DESCRIPTION OF THE SEVERAL VIEWS OF THE DRAWINGS

Embodiments of the present disclosure are shown in the drawings and explained in greater detail below.

FIG. 3 shows a perspective view of a sliding element of the plug of FIG. 1.

FIG. 4 shows a perspective view of a blocking element of the plug of FIG. 1.

FIG. 5 shows a top view of a detail of the plug of FIG. 1 with a blocking element of FIG. 4 in an open position.

FIG. 6 shows a top view of a detail of the plug of FIG. 1 with a blocking element of FIG. 4 in a locked position.

DETAILED DESCRIPTION

The figures may contain partially simplified, schematic representations. In part, identical reference signs are used for like, but possibly not identical elements. Different views of like elements may be scaled differently.

Figure 1:
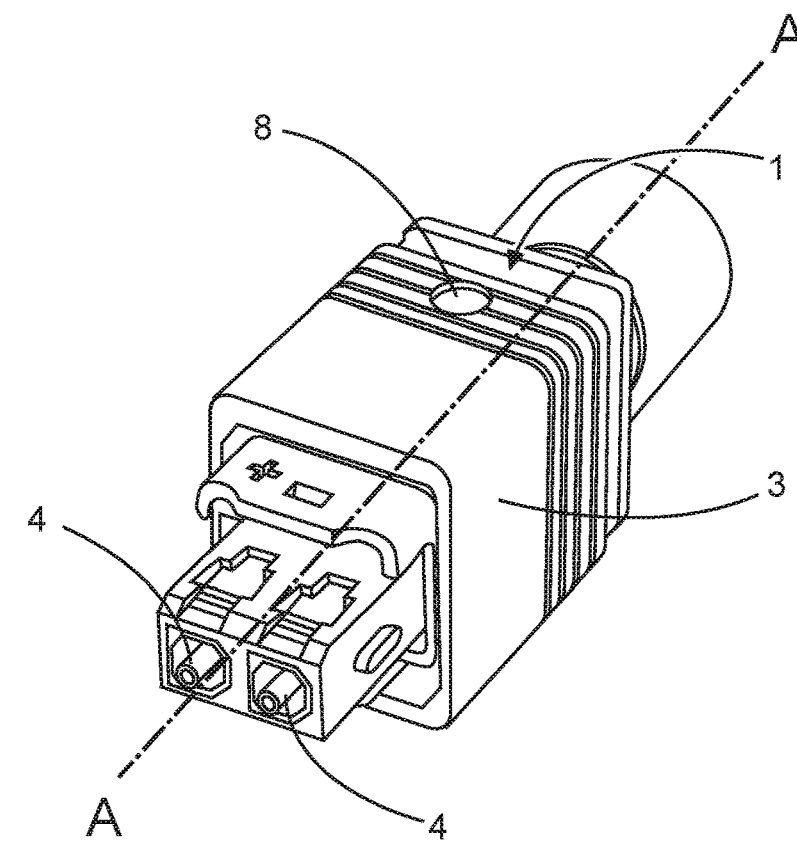
FIG. 1 shows a perspective view of a plug according to one embodiment of the invention.

FIG. 1 shows a plug 1 according to one embodiment of the present disclosure. In this example, the plug 1 has contact elements 4 for transmitting optical data signals. However, other contact elements, for example, electrical contact elements, can also be provided.

The plug 1 shown here is a so-called push-pull plug. As explained above, the plug 1 has a sliding element 3. When the plug 1 is connected to a suitable socket (not shown) or a mating plug (also not shown), the sliding element 3 is mounted on a main body 2 of the plug 1 so as to be displaceable—along an insertion or plugging axis A.

Figure 2:
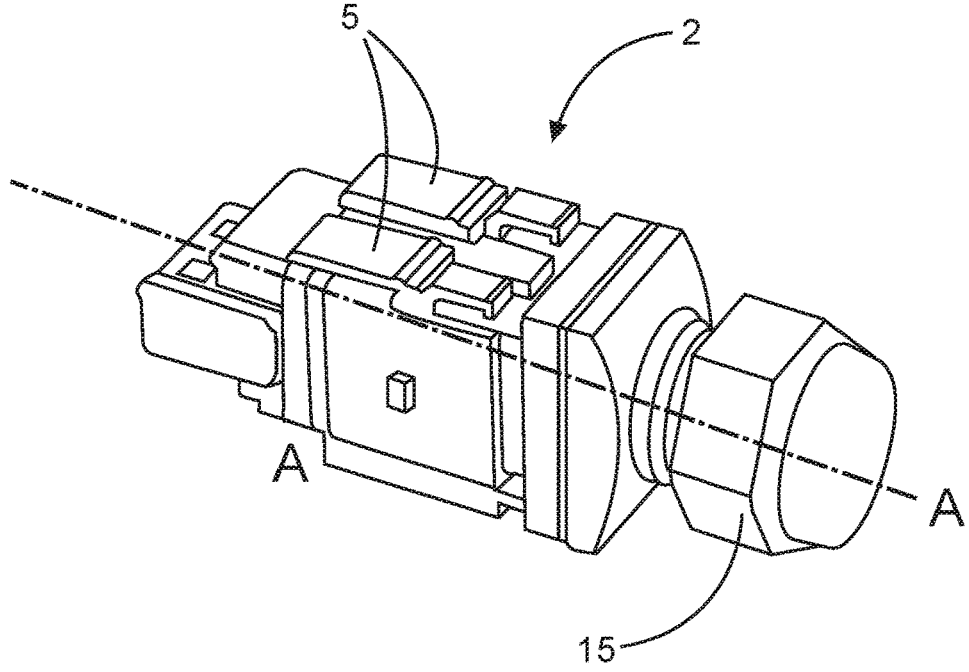
FIG. 2 shows a perspective view of a main body of the plug of FIG. 1.

FIG. 2 shows the main body 2 of the plug 1. Two tabs 5 running parallel to one another are integrally molded on the main body 2 and extend parallel to the plugging axis A. The tabs 5 are used to secure the sliding element 3 to the main body 2. The tabs 5 are used on the one hand to fix the sliding element 3 to the main body 2 captively. On the other hand, between the tabs 5 there runs a channel, in which a guide rail 7 integrally molded on the inside of the sliding element 3 runs. This ensures that the sliding element 3 can be moved along the plugging axis A on the main body 2 in a straight line and without jamming.

FIG. 3 shows the sliding element 3 in a three-dimensional view. The sliding element 3 has the shape of a sleeve with a substantially rectangular cross-section. The guide rail 7 mentioned above can be seen on the inside. The guide rail 7 is arranged between the tabs 5 of the main body 2. The sliding element 3 has an opening 9 in which the blocking element 8 is arranged or rotatably mounted. The blocking element 8 is shown separately in FIG. 4.

The blocking element 8 has a rib 10 that protrudes from the inside of the sliding element 3. On the outside, the blocking element 8 has a contour 11, which in this embodiment is embodied as a slot for engaging a slotted screwdriver (not shown). The blocking element 8 can be rotated via this contour with the aid of the screwdriver, wherein the axis of rotation D is perpendicular to the plugging axis.

By a rotary movement, the blocking element 8 can be brought into an open position as shown in FIG. 5. In this position, the rib 10 of the blocking element 8 is parallel to the guide rail 7 of the sliding element 3. In this rib position, the sliding element 3 can be moved back and forth along the plugging axis A on the main body 2, so that the connection of the plug 1 can be made but also disconnected.

FIG. 6 shows the locked position of the blocking element 8. In this position, the rib 10 of the blocking element 8 is oriented perpendicular to the guide rail 7. If it is desired to move the sliding element 3 in this situation, the rib abuts against the tabs 5 of the main body 2. This blocks any further movement of the sliding element 3. A plug 1 that is in a plugged situation cannot be accidentally pulled off. It is also not possible to plug or connect the plug 1 in this position of the blocking element 8.

In the embodiment shown here, the orientation of the contour 11 indicates whether the blocking element 8 is in an open position or in a locked position. If the contour 11 is oriented parallel to the plugging axis A, the blocking element 8 is in an open position (FIG. 5). However, if the contour 11 is perpendicular to the plugging axis, the blocking element 8 is in the locked position (FIG. 6). In this way, the locked state of the plug can already be recognized visually.

The plug 1 has a cable gland 15. When the connection of the plug 1 is released, the sliding element 3 is pulled in the direction of the cable gland 15—in the so-called connection direction. This pulling direction is blocked by the blocking position of the blocking element 8, 8'.

Figures 7, 8, 9, 10, 11:
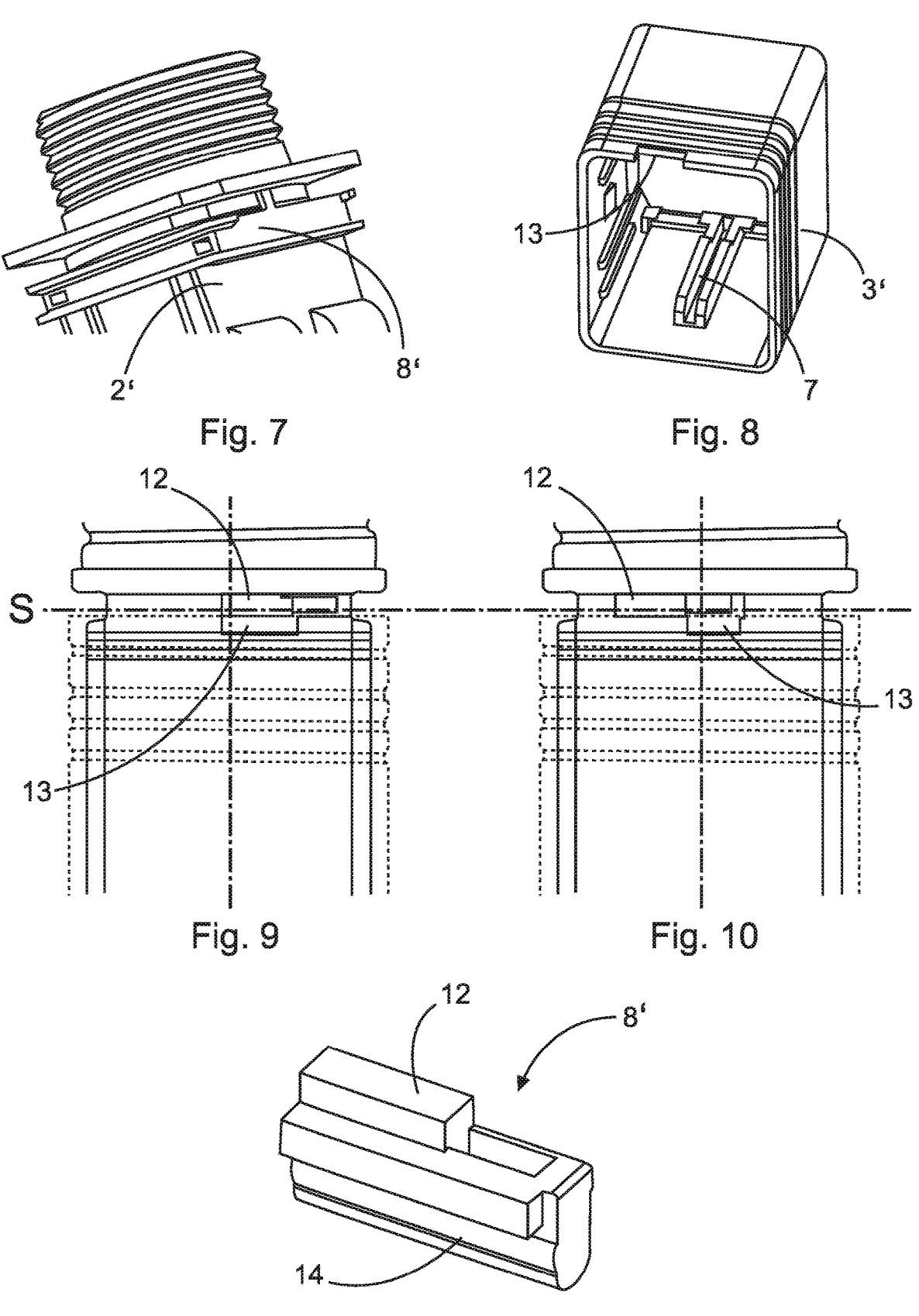
FIG. 7 shows a perspective partial detail of a main body of an alternative embodiment of a plug.
FIG. 8 shows a perspective partial detail of a sliding element of the alternative embodiment of the plug of FIG. 7.
FIG. 9 shows a top view of a detail of the alternative plug of FIG. 7 with a blocking element in an open position.
FIG. 10 shows a top view of a detail of the alternative plug of FIG. 7 with a blocking element in a locked position.
FIG. 11 shows a perspective view of the blocking element of the alternative plug of FIG. 7.

FIG. 7 shows a detail of a main body 2' belonging to an alternative embodiment of a plug. In the main body 2' there is formed a groove, in which a sliding rib 14 of an alternative blocking element 8' engages, whereby the latter is mounted on the main body 2' so as to be displaceable along the sliding axis S.

FIG. 8 shows the sliding element 3' of the alternative embodiment of the plug. On the connection side, the sliding element 3' has, at its edge, a recess 13 in which a blocking rib 12 of the associated blocking element 8' (see FIG. 11) can be accommodated with a precise fit.

FIG. 9 shows the blocking element 8' in its open position. When the sliding element 3' is pulled in the connection direction, the recess 13 engages over the blocking rib 12 of the blocking element 8'. In this position, the connection of the plug can be released.

FIG. 10 shows the blocking element 8' in its locked position. When the sliding element 3' is pulled in the connection direction, its edge abuts against the blocking rib 12 of the blocking element 8'. In this position, the connection of the plug cannot be released.

Even though various aspects or features of the disclosure are each shown in combination in the figures, it is apparent to a person skilled in the art—unless otherwise indicated—that the combinations shown and discussed are not the only possible ones. In particular, corresponding units or feature complexes from different exemplary embodiments may be interchanged with each other.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A plug, comprising:
a main body;
a sliding element, wherein the sliding element encompasses the main body and is arranged thereon so as to be movable along a plugging axis of the plug; and
a blocking element, which is arranged rotatably on a sidewall of the sliding element to rotate between an open position, in which the blocking element enables the sliding element to slide relative to the main body in a direction of the plugging axis, and a locked position, in which the blocking element is obstructed by a portion of the main body to prevent the sliding element from sliding relative to the main body in the direction of the plugging axis, wherein an axis of rotation of the blocking element is perpendicular to the plugging axis of the plug and perpendicular to the sidewall of the sliding element on which the blocking element is arranged.

2. The plug as claimed in claim 1, wherein the sliding element has a through-opening in which the blocking element is arranged at least in regions.

3. The plug as claimed in claim 1, wherein the sliding element has an internal guide rail running parallel to the plugging axis.

4. The plug as claimed in claim 3, wherein the blocking element, which is arranged on the sliding element, has a rib directed toward the main body.

5. The plug as claimed in claim 4, wherein the rib of the blocking element is perpendicular to the internal guide rail of the sliding element when the blocking element is in the locked position, and wherein the rib of the blocking element is parallel to the internal guide rail of the sliding element when the blocking element is in the open position.

6. The plug as claimed in claim 5, wherein two tabs arranged parallel to each other are integrally molded on the main body.

7. The plug as claimed in claim 6, wherein the internal guide rail of the sliding element runs substantially between the two tabs of the main body when the sliding element is displaced relative to the main body.

8. The plug as claimed in claim 7, wherein the rib of the blocking element, during a sliding movement of the sliding element relative to the main body, abuts against the tabs when the blocking element is in the locked position.

9. The plug as claimed in claim 1, wherein the blocking element has, on an outside, a contour in which a tool can engage, so that a rotary movement of the blocking element can be generated with the tool.

\* \* \* \* \*